United States Patent [19]
Desmonds

[11] 3,934,132
[45] Jan. 20, 1976

[54] SHIFT NETWORK FOR DUAL WIDTH OPERANDS

[75] Inventor: Daniel J. Desmonds, Roseville, Minn.

[73] Assignee: Control Data Corporation, Minneapolis, Minn.

[22] Filed: June 10, 1974

[21] Appl. No.: 477,884

[52] U.S. Cl. .............................. 235/164; 340/172.5
[51] Int. Cl.² ......................................... G06F 7/00
[58] Field of Search ................... 235/164; 340/172.5

[56] References Cited
UNITED STATES PATENTS

| | | | |
|---|---|---|---|
| 3,790,960 | 2/1974 | Amdahl et al. | 340/172.5 |
| 3,810,115 | 5/1974 | Stafford | 340/172.5 |
| 3,818,203 | 6/1974 | Perlowski et al. | 235/164 |

*Primary Examiner*—David H. Malzahn
*Attorney, Agent, or Firm*—William J. McGinnis, Jr.

[57] ABSTRACT

A shift network is provided which may operate on one full width operand or on two one-half width operands, by splitting the shift network in the middle. The shift network in the present embodiment for 96 bit full width operands is constructed in four ranks so that the first rank shifts operand bits 0, 1, 2 or 3 bit positions, the second rank shifts operand bits 0 or 4 bit positions, the third rank shifts operand bits 0, 32, 64 or 96 bit positions, and the fourth rank shifts operand bits 0, 8, 16 or 24 bit positions, all shifts dependent upon the input shift count.

The shift network is responsive to two independent shift counts and a control signal specifying the half width mode when it is desired to split the network. Each rank of the shift network is divided into an upper half and a lower half. Special logic circuits are provided to extend the sign bit for the lower half operand into the lower half of each rank when operating in the two operand mode.

1 Claim, 9 Drawing Figures

SHIFT NETWORK FOR DUAL WIDTH OPERANDS

BACKGROUND OF THE INVENTION

This invention relates to digital computers and has application to pipeline methods of computing where a string of operands is passed through a system continuously and sequentially through various logic levels. More particularly this invention is related to a shift network in which the bits in the respective bit positions of an operand are shifted or relocated in a resultant operand. This invention is related to and may be used with the apparatus shown in U.S. Patent application Ser. No. 345,613, filed Mar. 28, 1973, now U.S. Pat. no. 3,831,012.

SUMMARY OF THE INVENTION

This invention is a special purpose shift network adapted for use in pipeline computing systems through the use of various logic levels or ranks so that sequentially received operands can be stepped through the shift network in sequence. A feature of this shift network is the ability to operate in either of two alternate modes, that is on full width operands or on two one-half width operands simultaneously.

Each of the ranks of the shift network is generally composed of logic associated with the individual bits of the resultant from that rank and having either multiple bits of the input operand input to each output generator or multiple bits from the previous rank input to each output generator together with control signals to determine which of the input bits is to be gated to the output. Conventional decode logic can be used to decode the input shift count operand into gating signals for the ranks of the network. For example, each rank of the network could be based on the condition of a single bit of the shift count operand and accordingly gate in either of two directions. However, in the present embodiment of the invention, three of the four ranks are based on decodes of two adjacent bits of the input shift count operand to gate any one of four inputs as the resultant for that rank.

The network is split by providing gates which in alternate modes of operation transfers either bits from the upper half of operands to the lower half of the same operand or gates the sign bit of the lower operand in the two operand mode of operation. The operation of the sign transfer system requires additional gates in some portions of the ranks to account for the possible transfer of sign bits rather than operand bits.

DESCRIPTION OF THE PREFERRED EMBODIMENT

Figure 5:
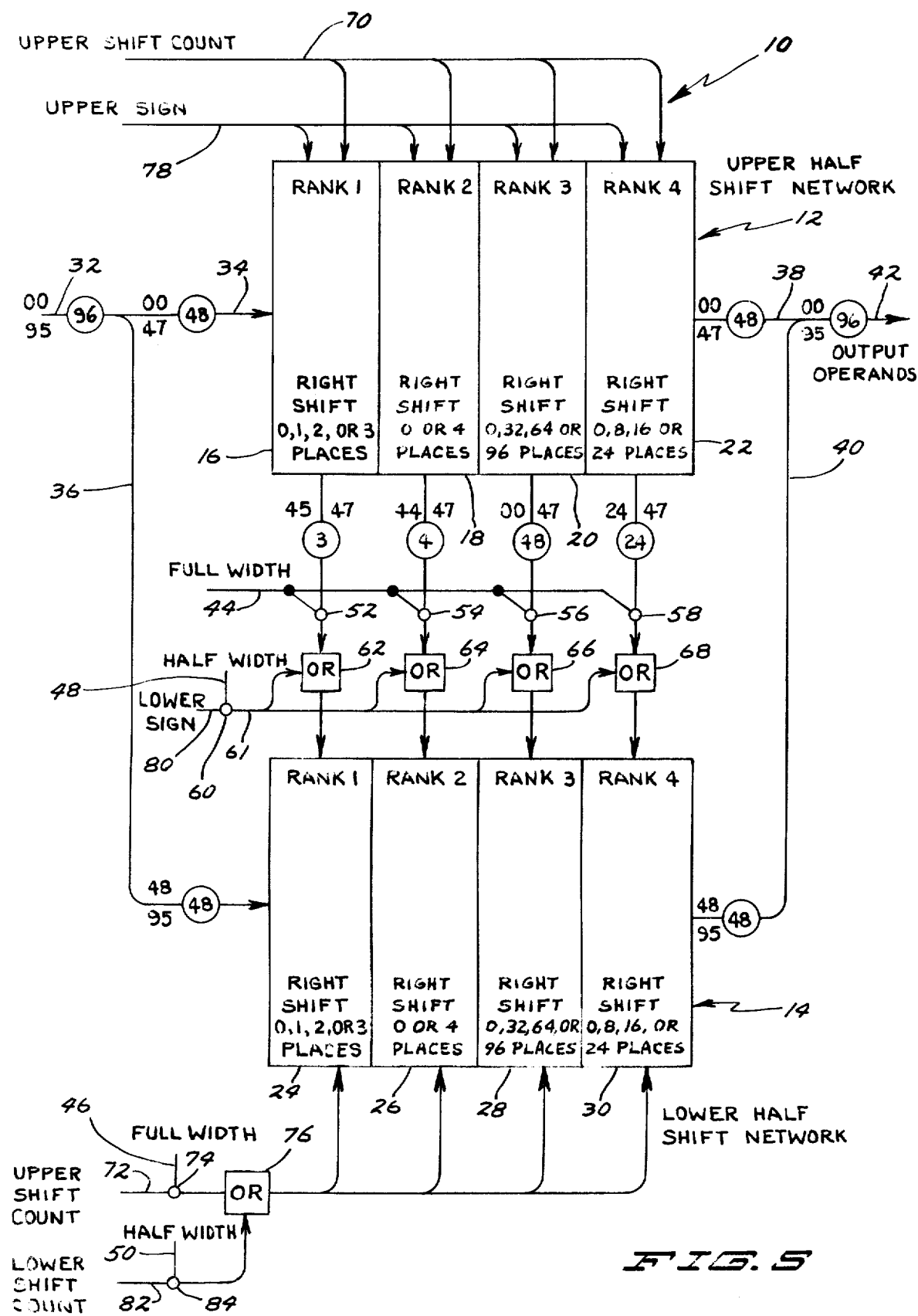
FIG. 5 is a schematic of a shift network according to the present invention and shown in greater detail in FIGS. 1–4 and 6–9.

Referring to FIG. 5, a shift network 10 according to the present invention is shown which may operate on either one full width operand or, alternatively on two independent one-half width operands simultaneously. Network 10 is divided into an upper half 12 and a lower half 14. The upper half 12 of the shift network is, in this embodiment of the invention composed of four ranks 16, 18, 20 and 22. These ranks perform shift operations on the upper half of single operands containing bits having the highest positional values or on one of the two independent operands which will herein be called the upper operand. Similarly, the lower half 14 of the shift network is, in this embodiment of the invention composed of ranks 24, 26, 28 and 30 which perform shift operations on the lower half of full width operands or on the other one of the two independent operands, herein called the lower operand. Each of ranks 16, 18, 20, 22, 24, 26, 28 and 30 contains a label indicating the shift capability of that rank in respect to 96 bit operands which is the full width operand capability of this embodiment of the invention. It will be seen by one skilled in the art how to use fewer ranks for smaller operands or more ranks for larger operands in other embodiments of the invention. The ranks are designated 1, 2, 3 and 4 in association with their shift capability to facilitate understanding of FIGS. 1, 2, 3 and 4.

In FIG. 5, input operands containing bits 00 through 95 are supplied on a 96 bit data trunk 32. Data trunks are labeled with trunks widths and contents, as shown, throughout FIG. 5. Data trunk 32 is divided into upper half data trunk 34 connected with the upper half 12 of the shift network 10 and into lower half data trunk 34 connected to the lower half 14 of the shift network. Similarly output half width data trunks 38 and 40 are combined into full width output data trunk 42.

Signals are provided on control lines 44 and 46 to indicate that the shift operation is to be performed on one full width operand. Similarly, control lines 48 and 50 carry signals indicating the shift of two independent half width operands.

Control line 44 is connected with AND gates 52, 54, 56 and 58 to control the gating of signals from the upper half of the shift network to the lower half during shifting of full width operands. Similarly control line 48 is connected to AND gate 60 to control gating of the lower sign bit to the lower half of the shift network when operating in the two operand mode. This is to allow sign extension, since in right shifting, operand bit positions, which are vacated with no entering replacement bit, have the sign bit extended into the bit position. OR gates 62, 64, 66 and 68 gate whichever of the input quantities is received to the lower half 14. It is obvious that these OR gates will be as wide as the data trunk extending between the respective ranks of the upper half and lower half of the shift network. The lower sign bit is provided as the second input to AND gate 60.

The upper shift count operand is provided on data trunks 70 and 72 to the network when operating in the full width mode, the lower half of the network 14 receives the same shift count operand as the upper half of the network. Thus, in the full width mode, the control signal on line 46 causes an AND gate 74 to transfer the upper shift count to OR gate 76 and thereafter to ranks 24, 26, 28 and 30. The upper sign bit is supplied on data trunk 78 and the lower sign bit on data trunk 80. The lower shift count operand is supplied on data trunk 82 connected with AND gate 84 so that the lower shift count is gated to OR gate 76 in the two operand mode. It should be obvious that the network operates in either one mode or the other so that OR gates 62, 64, 66, 68 and 76 will only receive one input at a time.

Figure 1:
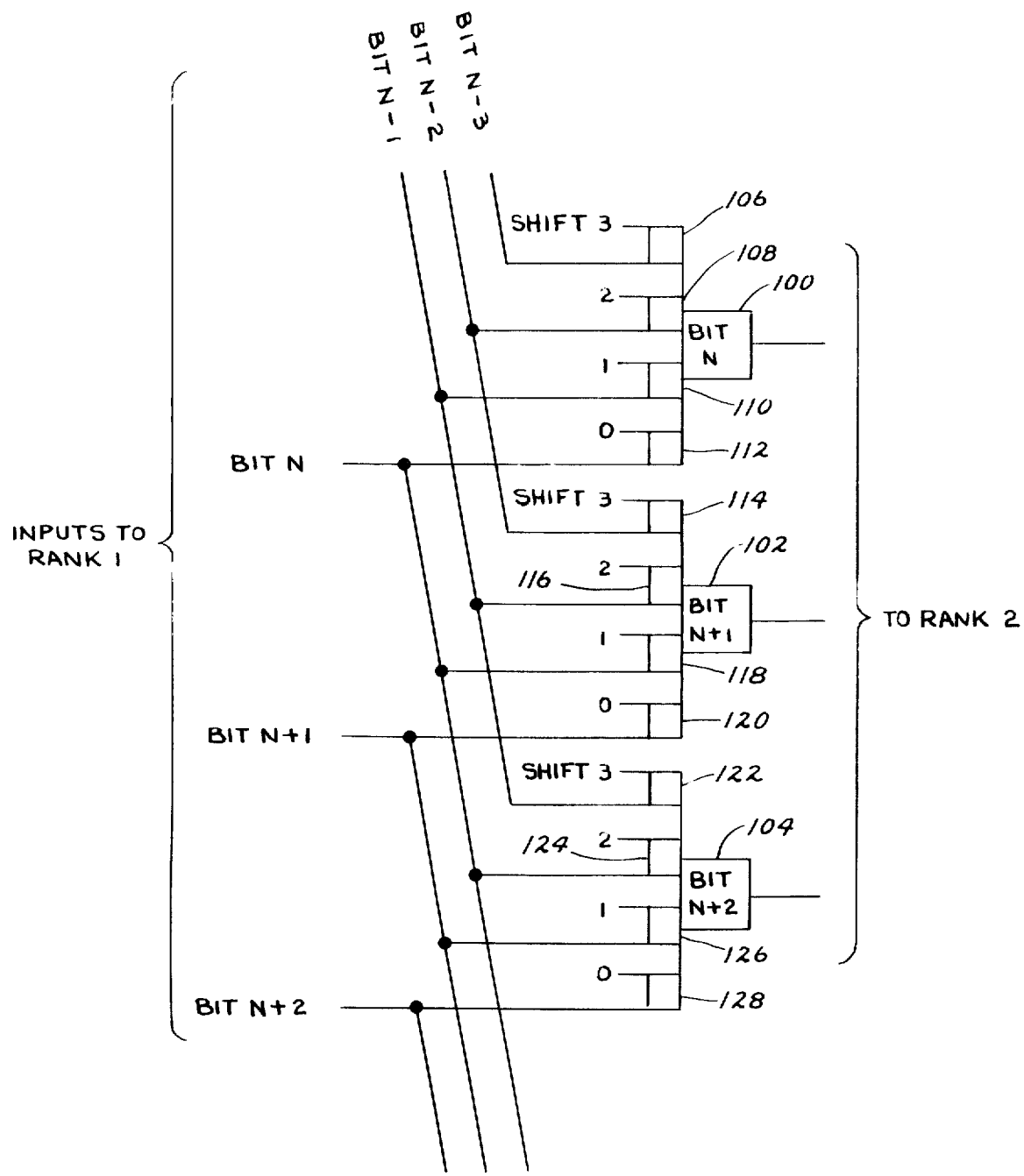
FIG. 1 is a simplified logic diagram of a typical group of bits of rank one of the shift network according to one form the present invention where the logic is repeated throughout the network.

Referring now to FIGS. 1, 2, 3 and 4, the operations of ranks 1, 2, 3 and 4, respectively, for both the upper and lower halves of the shift network is shown in simplified form with respect to operation on full width operands. In FIG. 1, OR gates 100, 102 and 104 produce the outputs for the operand bits, as labeled, by gating the output of whichever of AND gates 106, 108, 110 and 112 associated with OR gate 100, AND gates 114, 116, 118 and 120 associated with OR gate 102, AND gates 122, 124, 126 and 128 associated with OR gate 104 is activated by the appropriate shift control signal. For example, if a shift of three is required of rank one, then AND gate 106 is made to transmit bit N-3 to OR gate 100 and thus as output resultant bit N.

Figure 2:
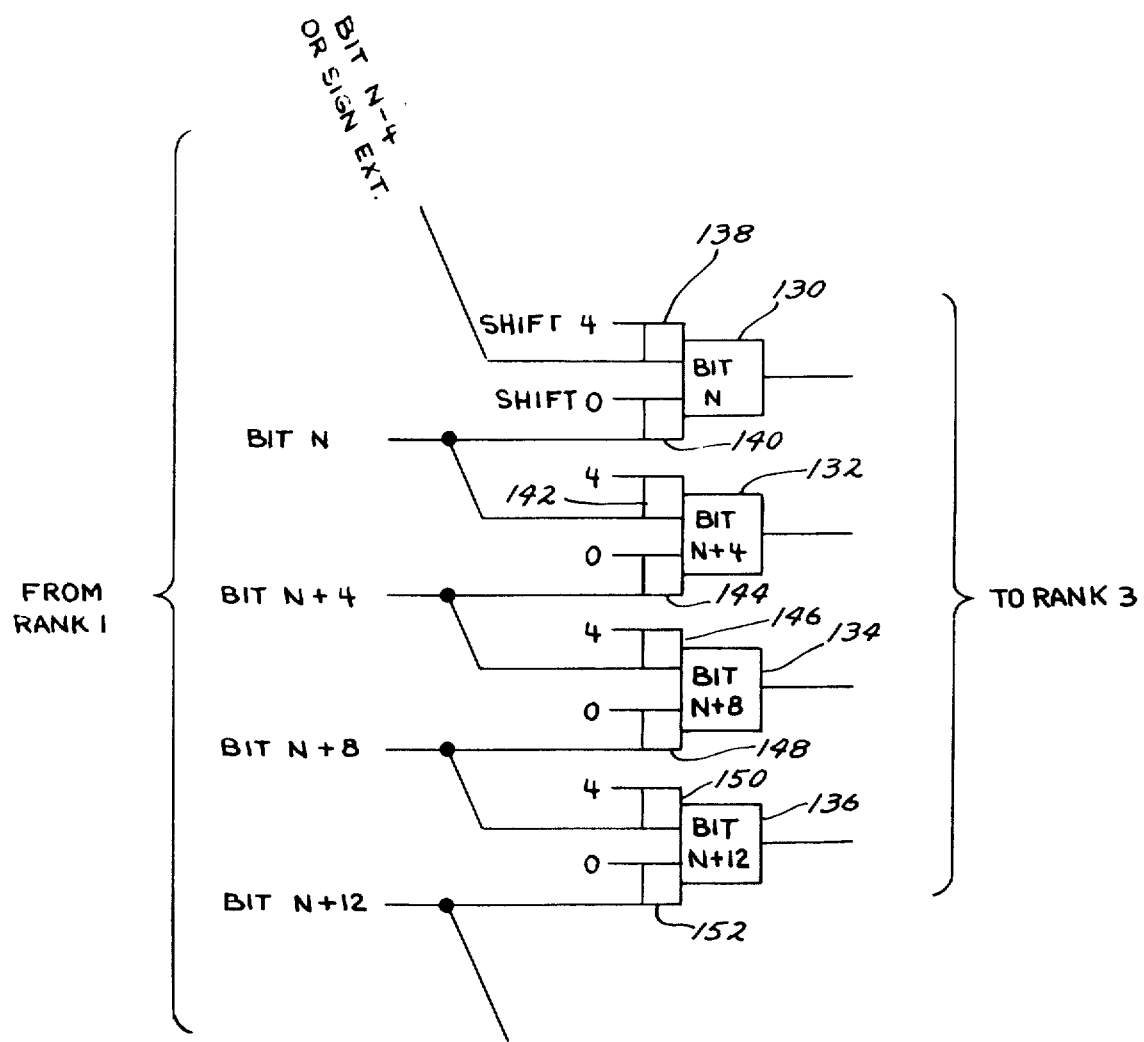
FIG. 2 is a simplified logic diagram of a typical group of bits of rank two of the shift network according to one form or the present invention where the logic is repeated throughout the network.
Figure 3:
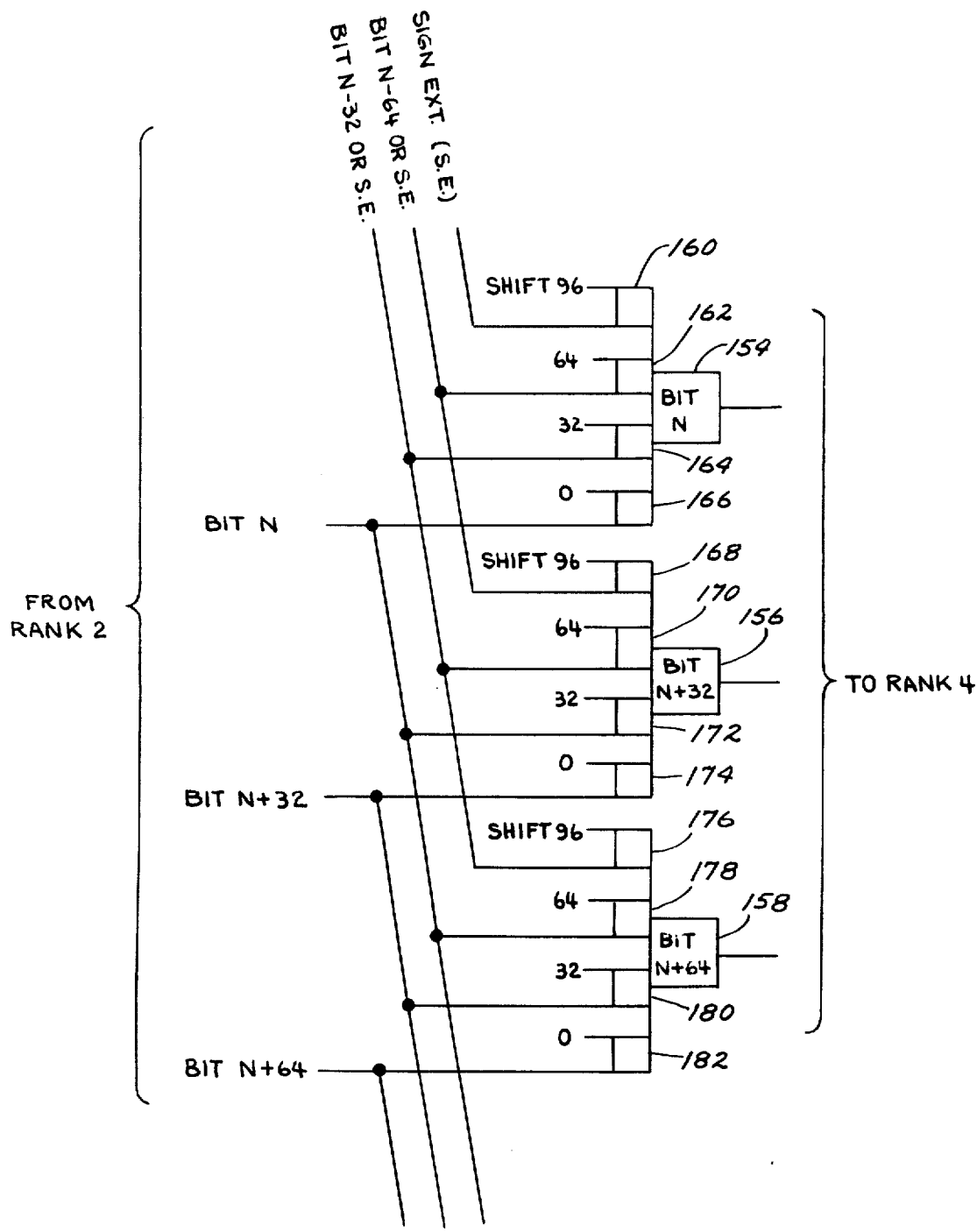
FIG. 3 is a simplified logic diagram of a typical group of bits of rank three of the shift network according to one form of the present invention where the logic is repeated throughout the network.
Figure 4:
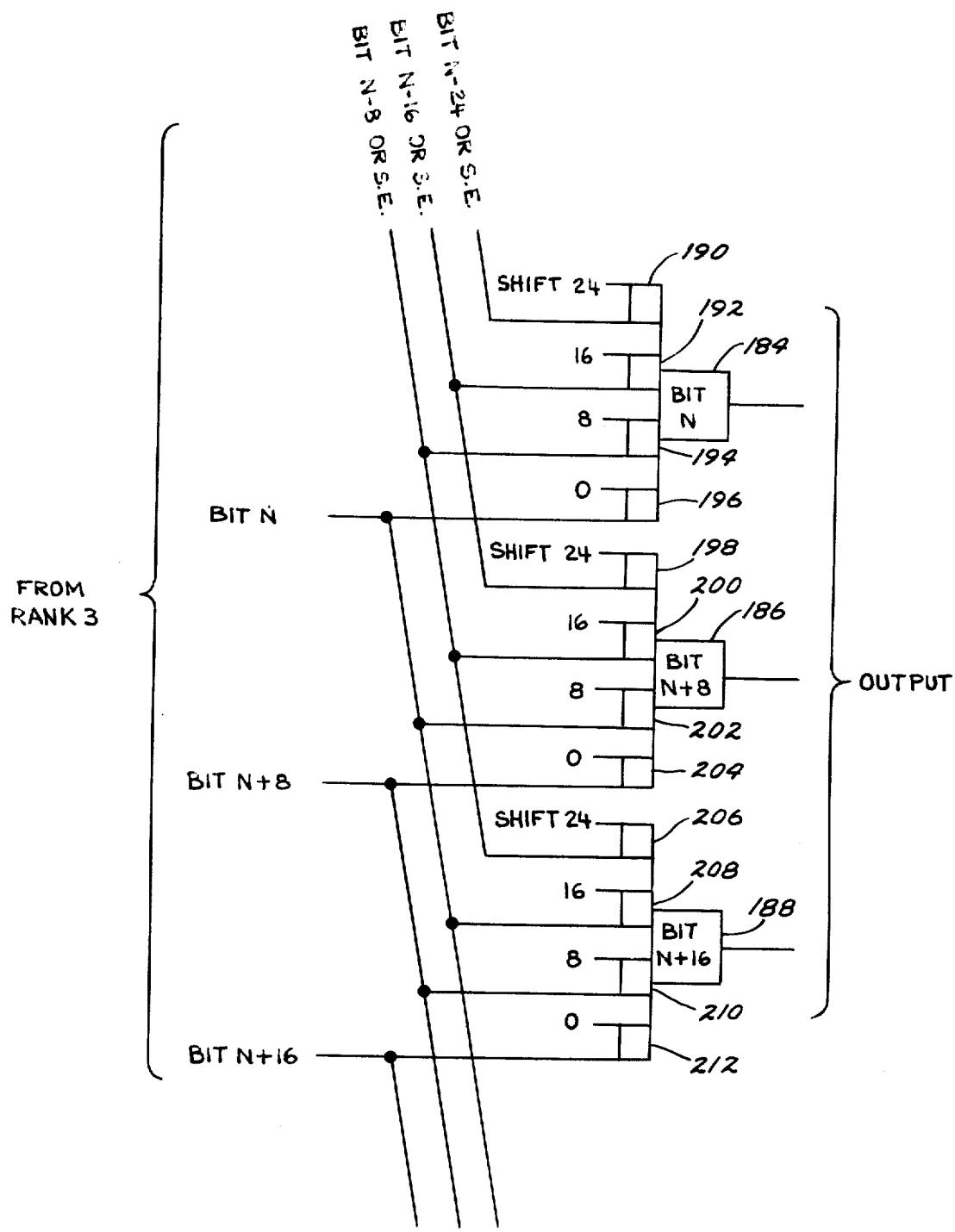
FIG. 4 is a simplified logic diagram of a typical group of bits of rank four of the shift network according to one form of the present invention where the logic is repeated throughout the network.

Similarly, in FIG. 2, OR gates 130, 132, 134 and 136 are associated with AND gates 138 and 140; 142 and 144; 146 and 148; and 150 and 152, respectively, for rank two. in FIG. 3, OR gates 154, 156 and 158 are associated with AND gates 160, 162, 164 and 166; 168, 170, 172 and 174; and 176, 178, 180 and 182, respectively. Finally, in FIG. 4, OR gates 184, 186 and 188 are associated with AND gates 190, 192, 194 and 196; 198, 200, 202 and 204; and 206, 208, 210 and 212 respectively. From FIGS. 1–4 it can be seen how operands are stepped through the ranks of the shift network in response to control signals generated from the input shift operand.

Figure 6:
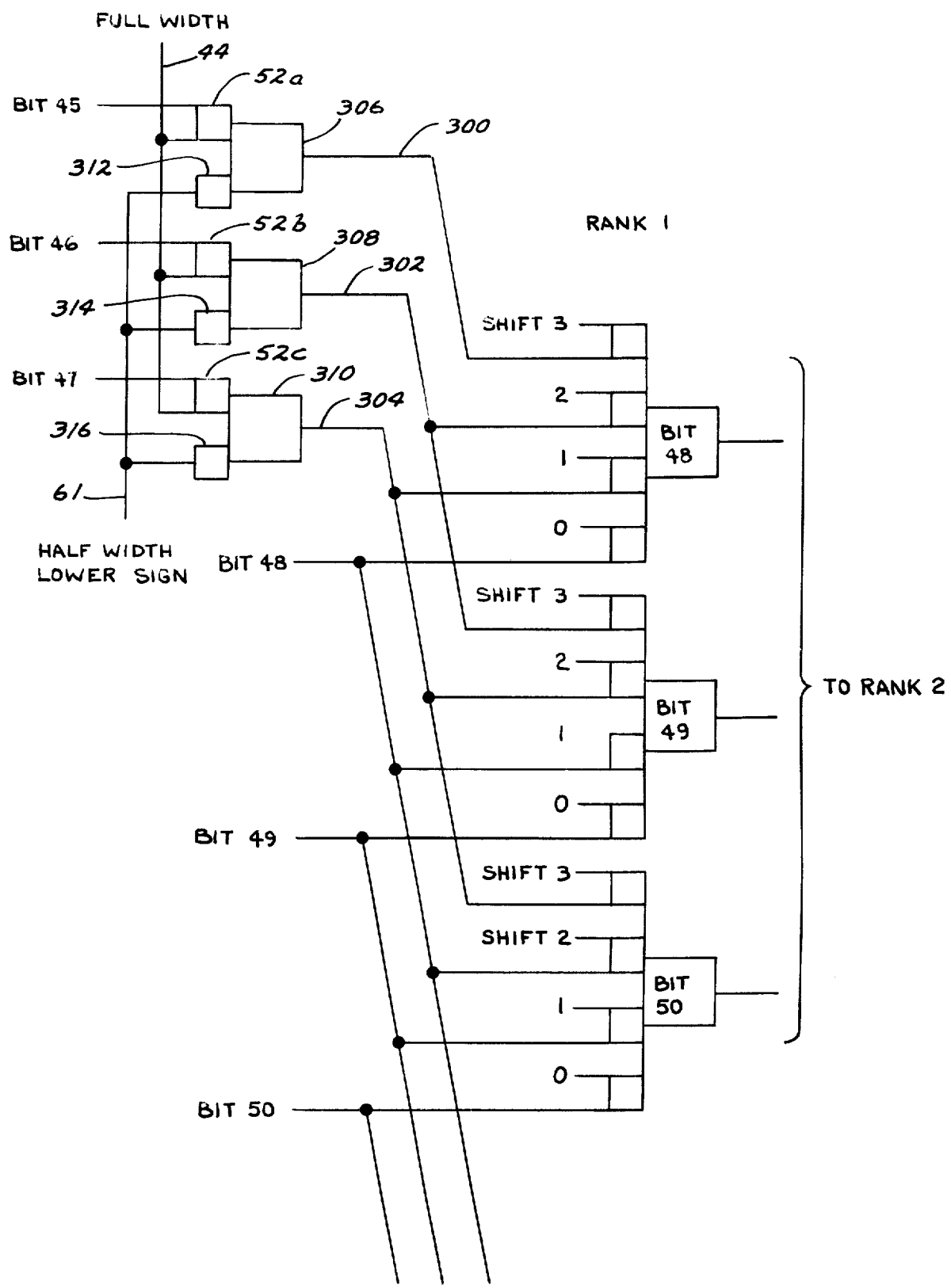
FIG. 6 is detailed logic diagram of a particular group of bits of rank 1 of the shift network shown in FIG. 5 for the lower half of the shift network showing sign extension logic for the two operand mode of operation.

Referring now to FIG. 6, the sign extension logic is shown for splitting rank one of the shift network. The three data lines labled 300, 302 and 304 represent the input data trunk to rank 24 in the lower half of the network. OR gates 306, 308 and 310 generate the signals flowing into these lines. AND gates 52a, 52b and 52c generate one input to these OR gates from the control line 44 input and the respective operand bits from rank 16, as labled and shown, on FIGS. 5 and 6. The output of AND gate 60, on FIG. 5 is line 61, which is connected to AND gates 312, 314 and 316 to provide second inputs to OR gates 306, 308 and 310 respectively. The remainders of FIG. 6 follows the same pattern as FIG. 1 with bit 48 of FIG. 6 taking the place of bit N in FIG. 1, bit 49 taking the place of bit N + 1, and bit 50 taking the place of bit N + 2. FIG. 6 shows the sign extension logic between ranks 16 and 24 of FIG. 5 and the remainder of ranks 16 and 24 is patterned after the system of FIG. 1.

Figure 7:
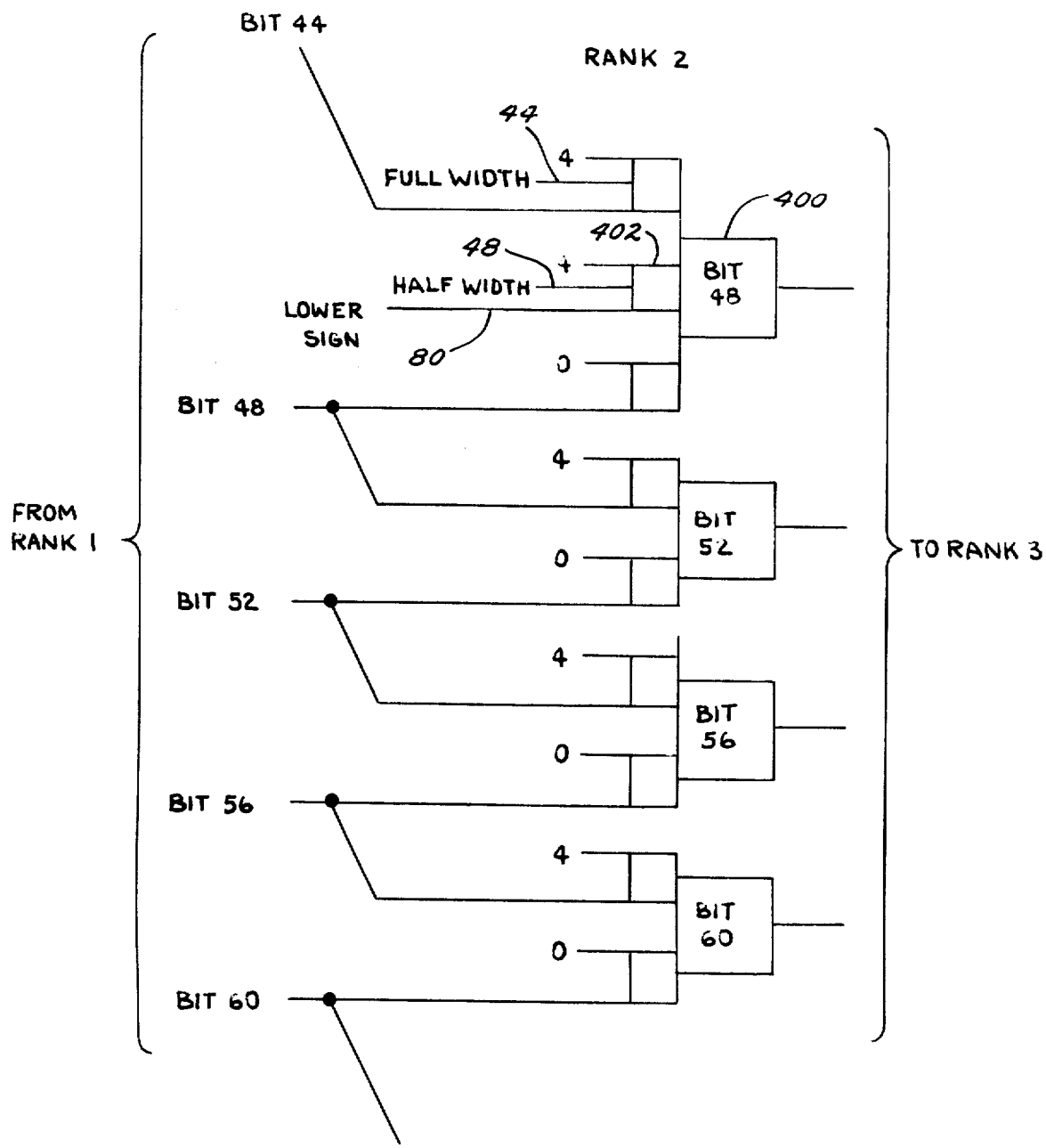
FIG. 7 is a detailed logic diagram of a particular group of bits of rank 2 of the shift network shown in FIG. 5 for the lower half of the shift network showing sign extension logic for the two operand mode of operation.

FIG. 7 shows the adaptation of rank 2 shown in FIG. 2 to perform the sign extension function for the upper four bits of rank 26 in FIG. 5. OR gate 400 for bit 48, in effect, has an extra AND gate 402 for half width operation which has as inputs the half width control line 48, the lower sign data line 80 and the shift operand four control line. This is in effect taking gate 60 shown on FIG. 5 and adding as an additional input the shift count control line. Bits 52, 56 and 60 shown on FIG. 7 operate as shown in connection with FIG. 2. Bits 49, 50 and 51 of rank 26 are configured similarly to bit 48 as shown on FIG. 7. One of the features of this design configuration is that the number inputs to OR gate 400 may be reduced since for a zero shift it does not make any difference to bit 48 if the system is configured in half width or full width mode.

Figure 8:
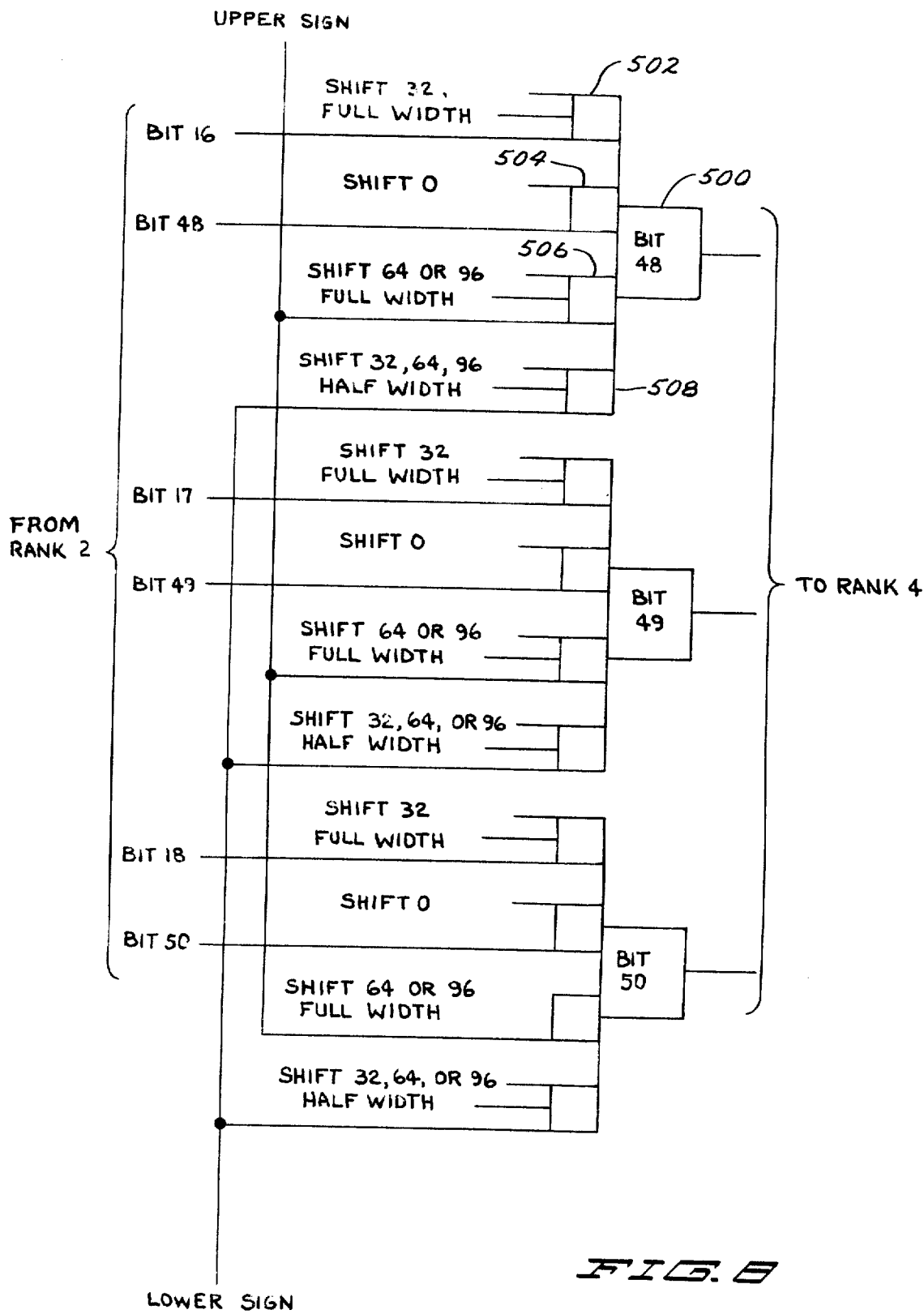
FIG. 8 is a detailed logic diagram of a particular group of bits of rank 3 of the shift network shown in FIG. 5 for the lower half of the shift network showing sign extension logic for the two operand mode of operation.

FIG. 8 shows the pattern of gates which must be superimposed on the configuration of FIG. 3 to form rank 28 shown on FIG. 5 having full width and half width capability. For example, OR gate 500 is connected with AND gates 502, 504, 506 and 508. The logic is simplified considerably by recognizing that for bit 48, a full width shift of 64 or 96 or a half width shift, where bit 48 becomes bit O of the lower operand, of 32, 64 or 96 produces only sign extension, allowing combination of these functions in a single gate rather than in three separate gates. Obviously the combination of the shift operand control lines for 32, 64 and 96 can be made by a single OR gate which is not shown in FIG. 8, for the sake of simplicity. Thus, the logic pattern shown in FIG. 8 is demonstrative of what is accomplished in rank 28 shown in FIG. 5.

For pipeline operation it is important that operands flow through ranks 16 and 24; 18 and 26; 20 and 28; and 22 and 30 in roughly the same amount of time based on the computers cycle time so that resultant operands are produced at the same time. As may be apparent from FIG. 8, the simplification of logic produced by recognizing that certain shift operations produce the equivalent results to other shift operations allows the logic levels to operate on the same time scale as between ranks in the upper half of the network and the lower half of the network.

Figure 9:
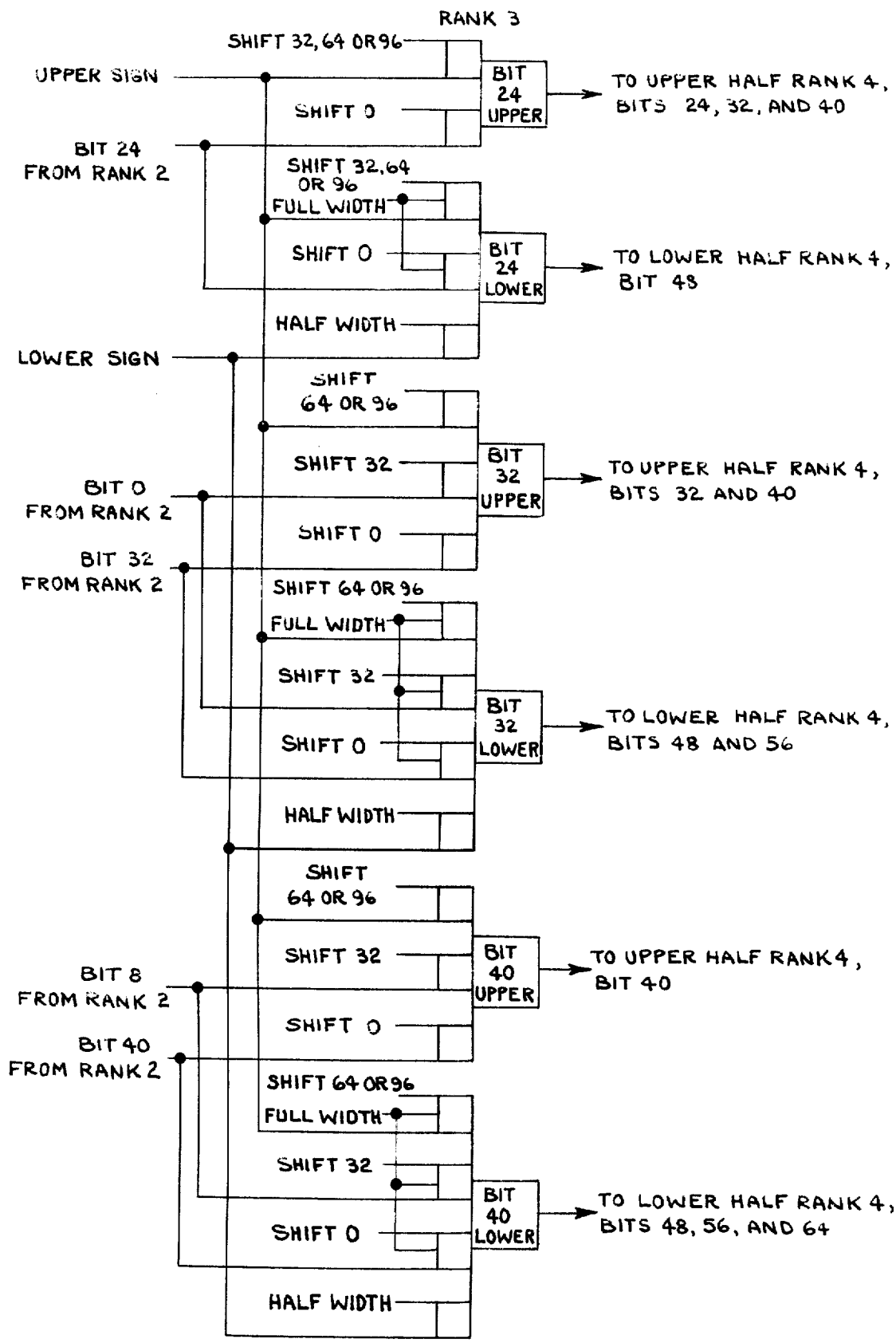
FIG. 9 is a detailed logic diagram of a particular group of bits of rank 3 of the shift network shown in FIG. 5 for the upper half of the shift network showing sign extension into the lower half of rank 4 in the two operand mode of operation.

Referring now to FIG. 9, the upper half of rank 3, equivalent to rank 20 of FIG. 5 is shown in combined form with bits of rank 28 to show the generation of outputs to rank 4 in both the upper half and lower half of the shift network. The network of FIG. 9 is patterned from FIG. 3, but shows in the same manner as does FIG. 8, that certain logic functions may be simplified for particular bits of the ranks by recognizing that certain shift operations will produce identical results for particular bits. From the FIGURES it is believed to be clear how to construct the logic for each and every bit of the entire shift network according to this or any other embodiment of the invention.

What is claimed is:

1. A shift network which may operate in two alternate shift modes, the shift mode being preselected, the first mode being the shifting of a single full width input operand and the second mode being the shifting of two independent one half width input operands, said network comprising
- an upper half section,
  said section being comprised of a plurality of ranks of logic gates which operate on individual bits of operands to switch said operand bits to different outputs corresponding to a partial shift to be performed by said rank, connected in serial order, each rank being responsive to a preselected control signal to perform the designated partial shift such that all of said ranks can perform any operand shift of a designated possible group of shifts, said upper half section receiving as an input in said first mode the upper half of full width operands and in said second mode the upper operand of a pair of operands, said input depending on the preselected shift mode,
- a lower half section,
  said section being comprised of a plurality of ranks of logic gates which operate on individual bits of operands to switch said operand bits to different outputs corresponding to a partial shift to be performed by said rank, connected in serial order each rank being responsive to a preselected control signal to perform a designated partial shift such that all of said ranks can perform any operand shift of a designated possible group of shifts, said lower half section receiving as an input in said first mode the lower half of full width operands and in said second mode the lower operand of a pair of operands, said input depending on the preselected shift mode; and
- means for connecting said upper and lower half sections comprised of logic gates responsive to control signals designating the preselected shift mode of said shift network to transfer bits of operands from the upper half section to the lower half section in the full width mode and to transfer sign extension bits in the half width mode to the lower half section.

* * * * *